United States Patent

Abe et al.

[11] Patent Number: 6,022,824
[45] Date of Patent: Feb. 8, 2000

[54] TITANIUM COMPOUND FOR PHOTOCHEMICAL REACTIONS AND METHOD FOR PRODUCING THE SAME

[75] Inventors: Yoshio Abe, Kyoto; Shinsei Okabe, Takatsuki, both of Japan

[73] Assignee: Murata Manufacturing Co., Ltd., Japan

[21] Appl. No.: 09/018,270

[22] Filed: Feb. 4, 1998

[30] Foreign Application Priority Data

Feb. 21, 1997 [JP] Japan ................................. 9-037295

[51] Int. Cl.$^7$ ............................ B01J 23/00; C01B 13/14; C01G 23/00; C01F 7/02
[52] U.S. Cl. ......................... 502/300; 423/592; 423/598; 423/600; 423/608; 423/610; 423/613; 502/308; 502/309; 502/323
[58] Field of Search ..................... 423/592, 598, 423/600, 608, 610, 613; 502/300, 308, 309, 323

[56] References Cited

FOREIGN PATENT DOCUMENTS

| | | |
|---|---|---|
| 0595078 | of 1993 | European Pat. Off. . |
| 0770579 | 11/1997 | European Pat. Off. . |
| 2585973 | of 1985 | France . |
| 4237390 | of 1994 | Germany . |
| 8-182934 | 7/1996 | Japan . |
| 2119356 | of 1983 | United Kingdom . |

OTHER PUBLICATIONS

"Synthesis of Thermally Stable Nanocrystalline Anatase by High–Temperature Hydrolysis of Titanium Alkoxide with Water Dissolved in Organic Solvent from Gas Phase"; *Journal of Materials Science Letters*; 15 (1996); pp. 197–200; by H. Kominami, Y. Takada, H. Yamagiwa, Y. Kera, M. Inoue and T. Inui.

"Preparation and Properties of Titania Pillared Clay"; *Materials Chemistry and Physics*; 17, (1987); pp. 87–101; by Shoji Yamanaka, Tatsuo Nishihara and Makoto Hattori.

Japan Chemical Society, 71st Autumn Annual Meeting; (1996), Preprints, p. 84, 4P1, β24.

15th "Symposium on Photocatalyst Chemistry", p. 29; Japan.

Electrochemical Society, 1996 Autumn Meeting, Synopses, p. 234, 1I12; Japan.

*Primary Examiner*—Gary P. Straub
*Assistant Examiner*—Cam N. Nguyen
*Attorney, Agent, or Firm*—Ostrolenk, Faber, Gerb & Soffen, LLP

[57] ABSTRACT

A titanium compound for photochemical reactions having a high catalytic activity per unit surface area and extremely good stability to heat treatment is made of a substitutional solid solution of titanium oxide in which aluminum atoms occupy titanium sites of the titanium oxide uniformly at a predetermined ratio. Aluminum atoms preferably occupy about 0.01 to 0.5% of the titanium sites. The titanium compound for photochemical reactions is obtained from a complex alkoxide of titanium and aluminum.

8 Claims, 5 Drawing Sheets

- ◆ COMPARATIVE EXAMPLE
- ■ EXAMPLE

TITANIUM COMPOUND FOR PHOTOCHEMICAL REACTIONS AND METHOD FOR PRODUCING THE SAME

BACKGROUND OF THE INVENTION

1. Field of the Invention

The present invention relates to a titanium compound for photochemical reactions and a method for producing the titanium compound.

2. Description of the Related Art

It has been known that titanium oxide generates electrons and holes which exert strong oxidation and reduction actions on the surrounding substance upon photoexcitation. These reactions are utilized for oxidation and reduction of water, decomposition of hazardous substances, sterilization, and inorganic and organic syntheses.

Titanium oxide having a large specific surface area and good crystalline properties performs efficient photochemical reactions. Production methods for such titanium oxide are reported as follows:

(1) J. Mater. Sci. Lett. 15, 197 (1996); a process comprising dissolving titanium alkoxide in toluene and hydrolyzing it in an autoclave by supplying water from the gas phase, while growing crystals simultaneously.

(2) Mater. Chem. Phys., 17 (1987) 87–101; a process comprising of intercalating titania between montmorillonite layers.

(3) Japan Chemical Society, 71st Autumn Annual Meeting (1996), Preprints, p. 94, 4P1, β24; a process comprising of intercalating titania between montmorillonite layers (as in (2) given above) and subsequent hydrothermal treatment.

(4) 15th "Symposium on photocatalyst chemistry", p. 29; a process for producing $TiO_2$ powder having a tunnel structure from $K_2Ti_4O_9$.

(5) Electrochemical Society, 1996 Autumn Meeting, Synopses, p. 234, 1112; a process for producing fine particles by utilizing the aqueous phase in reversed micelle.

(6) Japanese Laid-Open Patent Publication No. 8-182934; a process comprising doping or coating titanium oxide with a potassium compound and/or a phosphorus compound and an aluminum compound for improving efficiency.

The problems with the conventional fine highly crystalline titanium oxide powder are that the titanium oxide powder tends to aggregate and that the reaction product has difficulty in accepting diffusion of materials as the primary particles of the titanium oxide powder decrease in size. These properties cause a low catalytic activity per unit surface area. There is also thermal deterioration of the titanium oxide powder.

These problems can be solved if ultra-fine particles of titanium oxide are supported on a carrier without aggregation. Doing so, however, has the disadvantage of limiting the catalytic activity per unit volume or weight because of the carrier mass.

It has been proposed that the problem might be solved by using titanium oxide particles of irregular shape, such as a needle rather than a sphere. However, such titanium oxide shows good selectivity but poor catalytic activity.

Accordingly, there is a demand for a titanium compound used for photochemical reactions having very high catalytic activity per unit surface area and extremely high stability to heat. There also is a demand for a method for producing such a titanium compound.

SUMMARY OF THE INVENTION

The present invention is directed to a titanium compound and method for producing the titanium compound that satisfy these needs. The titanium compound for photochemical reactions is a solid solution of titanium oxide in which aluminum atoms occupy titanium sites of the titanium oxide uniformly at a predetermined ratio.

Aluminum atoms preferably occupy about 0.01 to 0.5% of the titanium sites, and more preferably occupy about 0.15 to 0.3% of the titanium sites.

It is also preferable that at least portion of the titanium compound has an anatase or rutile structure and that the titanium compound is prepared from a complex alkoxide of titanium and aluminum.

The method for producing the titanium compound for photochemical reactions comprises the step of synthesizing a complex alkoxide of titanium and aluminum. The method may further comprise the step of hydrolyzing the complex alkoxide of titanium and aluminum to yield a gel containing Ti—O—Al chemical bonds and the step of firing the gel in air.

According to the invention, the titanium compound exhibits high catalytic activity per unit weight and unit surface area and excellent stability to heat. In addition, the method yields the titanium compound with desirable properties in a simple manner without requiring expensive complex apparatus.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

The titanium compound for photochemical reactions according to the present invention is a solid solution of titanium oxide in which aluminum atoms occupy some of titanium sites in the titanium oxide uniformly at a predetermined ratio. As will be explained in detail below, it is preferable that about 0.01 to 0.5% of the titanium sites are occupied by aluminum atoms. Further, the titanium compound preferably has an anatase and/or rutile structure.

It is important in the present invention that aluminum atoms occupy some of titanium sites in the titanium oxide uniformly at a predetermined ratio. The inventors have determined that the method disclosed in Japanese Laid-Open Patent Publication No. 8-182934 gives neither a substitutional solid solution nor complete replacement of titanium in titanium oxide crystals by aluminum. To realize the uniform substitution of titanium with aluminum in the present invention, the titanium compound of the invention is prepared by a process which comprises a step of synthesizing a complex alkoxide (double alkoxide) of titanium and aluminum. The complex alkoxide then gives a gel containing Ti—O—Al chemical bonds.

Hereinafter, the preferred embodiments of the present invention are explained in more detail with reference to the drawings.

Mixtures of titanium isopropoxide and aluminum isopropoxide at varied ratios were prepared. Each of the mixtures was reacted in a three-neck flask under reflux for 24 hours. It was confirmed that a complex alkoxide of titanium and aluminum was produced by the fact that the solution changed in color during the reflux. The resulting complex alkoxide was reacted with 2-methoxy-ethanol to interchange alkoxy groups. The solution of the complex alkoxide was then dropped into boiling water to effect a hydrolysis. Thus was obtained a titania sol (in the form of slurry) having Al—O—Ti chemical bonds. The sol was spray-dried and the dried product was heated in the air at 550° C. for 2 hours. There were obtained several samples of titanium oxide compound crystals of substitutional solid solution in which titanium was uniformly replaced by aluminum in a prescribed amount, i.e., one atom of titanium was replaced by one atom of aluminum.

Figure 1:
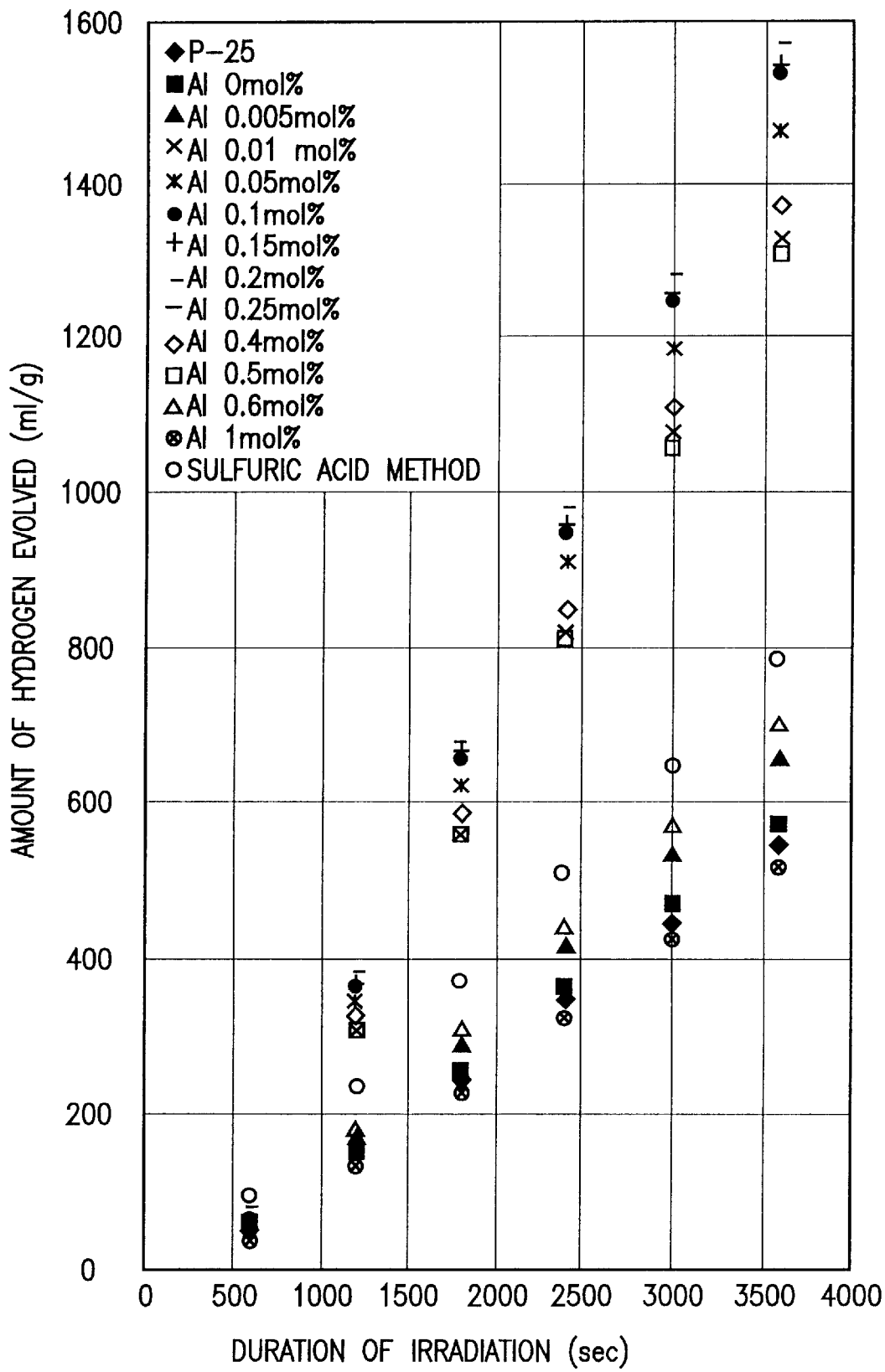
FIG. 1 is a diagram comparing the catalytic activity per unit weight (1 g) of the titanium compound according to an example of the present invention and that of conventional titanium oxide.

A 1 g of each titanium oxide thus obtained was suspended in 25 vol % aqueous ethanol solution. After a solution of chloroplatinic acid was added, the suspension was irradiated with light from a 400-W high-pressure mercury lamp of the internal irradiation type, so that the surface of titanium oxide compound was coated with of 0.5 wt % platinum. Thereafter, the aqueous ethanol solution with the titanium oxide compound coated with platinum was irradiated with the mercury lamp so that the relationship between the amount of hydrogen evolved and the duration of irradiation could be examined. The results are shown in FIG. 1. FIG. 1 also shows the results obtained using a titanium oxide having a trade name "P-25" (Nippon Aerosil Co., Ltd, Japan) and titanium oxide prepared by the sulfuric acid method and having a high specific surface area. The P-25 is a standard titanium oxide powder product used as a high-efficiency photocatalyst.

As can be seen from FIG. 1, the sample in which the amount of aluminum in the solid solution was 0 mol % had almost the same efficiency (in terms of the rate of hydrogen evolution) as P-25. The efficiency increases as the amount of the aluminum becomes greater and the sample in which the amount of aluminum in the substitutional solid solution is greater than about 0.01 mol % shows a remarkable improvement in the efficiency. When the amount of the aluminum is about 0.2 mol %, the efficiency becomes maximum and is as about twice as great as that of P-25. Beyond this amount, the efficiency linearly decreases and the efficiency suddenly decreases at an aluminum amount exceeding about 0.5 mol %. This result suggests that the amount of aluminum in the solid solution should preferably be in the range of about 0.01 mol % to 0.5 mol %, that is, the ratio of aluminum atoms that occupy titanium sites should preferably be in the range of about 0.01% to 0.5%. According to further study by the inventors, the amount of aluminum is more preferably in the range of about 0.15% to 0.3%.

Table 1 below relates the specific surface area ($m^2/g$) of each sample of titanium oxide powder listed in FIG. 1 to the aluminum content.

TABLE 1

| Amount of aluminum substituted (mol %) | Specific surface area ($m^2/g$) |
|---|---|
| 0.0 | 45 |
| 0.005 | 45 |
| 0.01 | 45 |
| 0.05 | 45 |
| 0.1 | 45 |
| 0.15 | 44 |
| 0.2 | 43 |
| 0.25 | 44 |
| 0.4 | 45 |
| 0.5 | 45 |
| 1.0 | 45 |
| P-25 | 52 |
| Sulfuric acid method | 290 |

Figure 2:
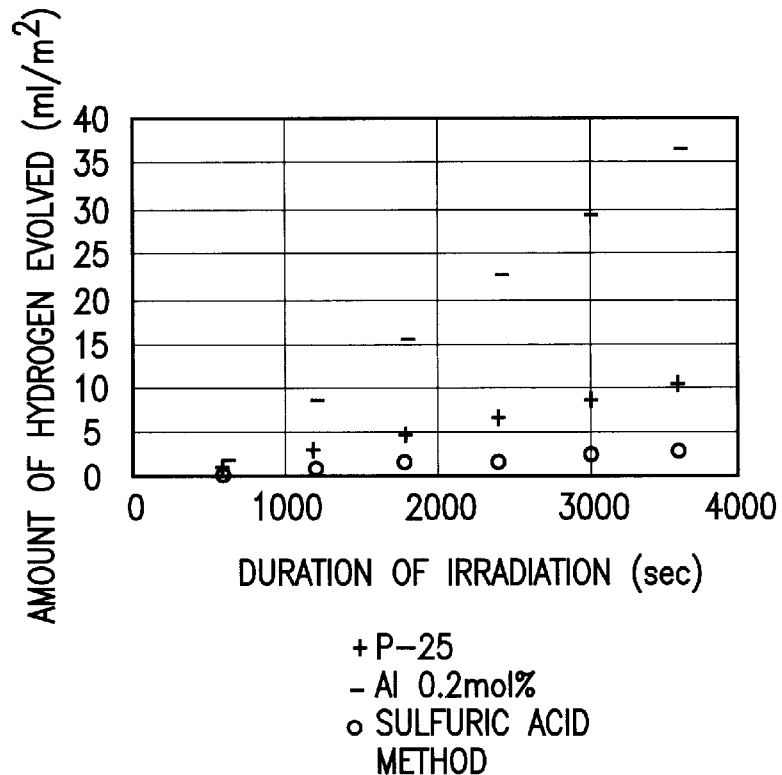
FIG. 2 is a diagram comparing the catalytic activity per unit surface area (1 $m^2$) of the titanium compound of according to an example of the present invention and that of conventional titanium oxide.

The amount of hydrogen evolution per unit surface area was calculated by dividing the amount of hydrogen evolution by the specific surface area shown in Table 1 for the sample having 0.2 mol % aluminum replacement, P-25, and titanium oxide prepared by the sulfuric acid method. The results are shown in FIG. 2. It is noted from FIG. 2 that the sample according to the present invention is by far superior in catalytic activity per unit surface area to the titanium oxide powder prepared by the sulfuric acid method and having a large specific surface area.

Figure 3:
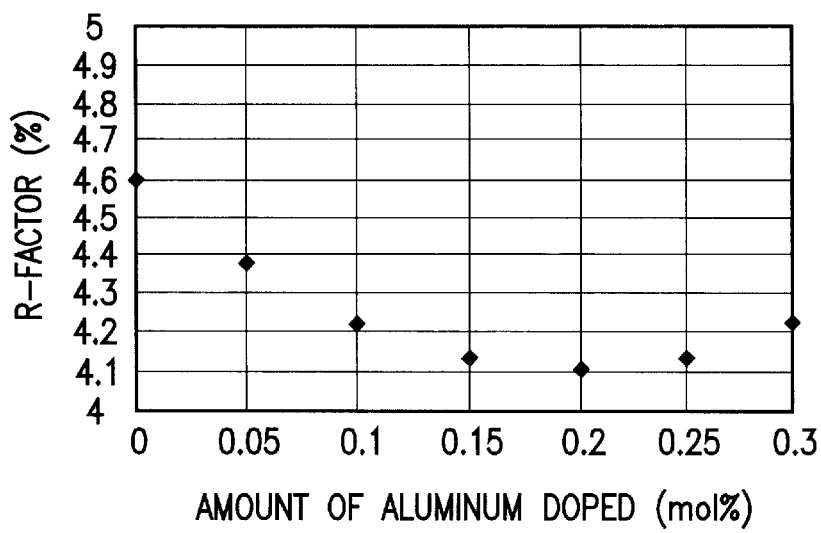
FIG. 3 is a diagram showing the result of Rietveld analysis on the titanium compound according to an example of the present invention.

The sample of titanium compound powder prepared by replacing 0.2% of titanium sites on titanium oxide with aluminum and heating for 2 hours at 550° C. in the air was analyzed by the Rietveld method. The results are shown in FIG. 3. The Rietveld method is suitable to determine the position of the constitutional elements in a crystal whose structure is known. The reliability of the result of analysis is indicated by an R-factor. A smaller R-factor indicates a more reliable result. In FIG. 3, the horizontal axis represents the amount of aluminum in the solid solution, and the vertical axis represents the R-factor corresponding to the horizontal axis. The amount of aluminum was calculated by a computer assuming that the positions of titanium atoms and an oxygen atoms are fixed and that the aluminum atoms occupied titanium sites. FIG. 3 shows that the value of R-factor is smallest when the amount of aluminum is 0.2 mol %. This result indicates that all aluminum atoms in the titanium oxide compound position at titanium sites to form a perfect substitution solid solution of titanium oxide in which some of the titanium sites of the titanium oxide are occupied by aluminum.

Figure 4:
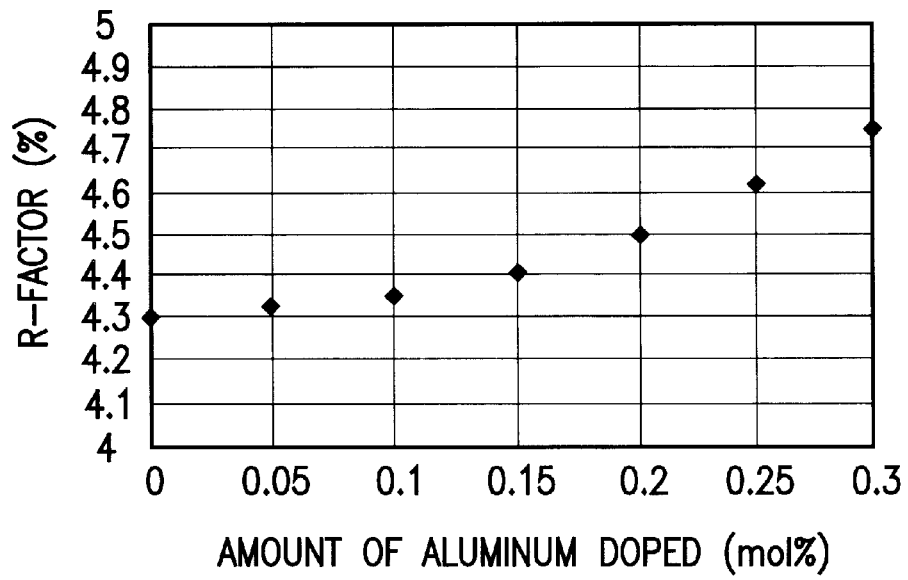
FIG. 4 is a diagram showing the result of Rietveld analysis on the titanium compound according to a comparative example.

For the purpose of comparison, samples of titanium compound powder were prepared in the same manner as mentioned above, except that titanium alkoxide and aluminum alkoxide were simply mixed without reaction to form a complex. The samples were analyzed by the Rietveld method. The results are shown in FIG. 4. It is noted from FIG. 4 that the value of R-factor is smallest when the titanium sites are not replaced by aluminum at all. This result indicates that doped aluminum atoms do not form the substitutional solid solution but form another phase or an interstitial solid solution.

Figure 5:
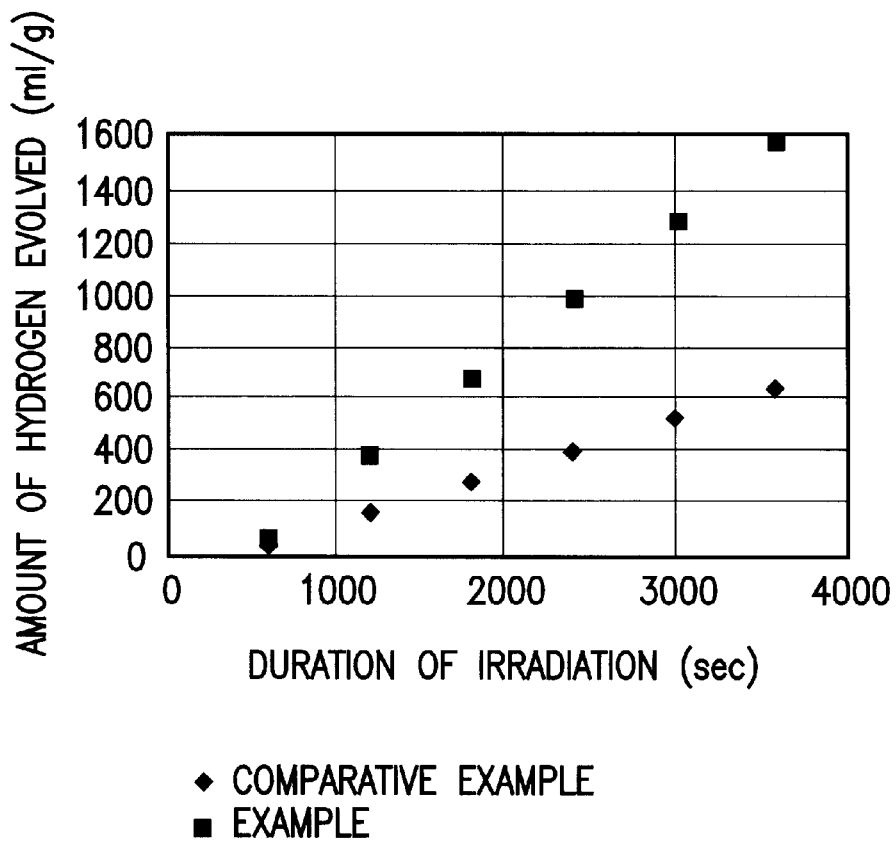
FIG. 5 is a diagram comparing the catalytic activity per unit weight (1 g) of the sample according to the example in FIG. 3 and that of the sample according to the comparative example in FIG. 4.

FIG. 5 is a diagram showing a comparison between the catalytic activity per unit weight (1 g) of the sample according to the example in FIG. 3 and that of the sample according to the comparative example in FIG. 4. As explained above, both of the two samples include 0.2 mol % of aluminum. The amount of hydrogen evolution measured in the same manner as mentioned above with reference to FIG. 1 is plotted against the duration of irradiation. FIG. 5 shows that the effect of the invention is not obtained even though the amount of doping is the same unless aluminum atoms occupy the titanium sites to form the substitutional solid solution.

Figure 6:
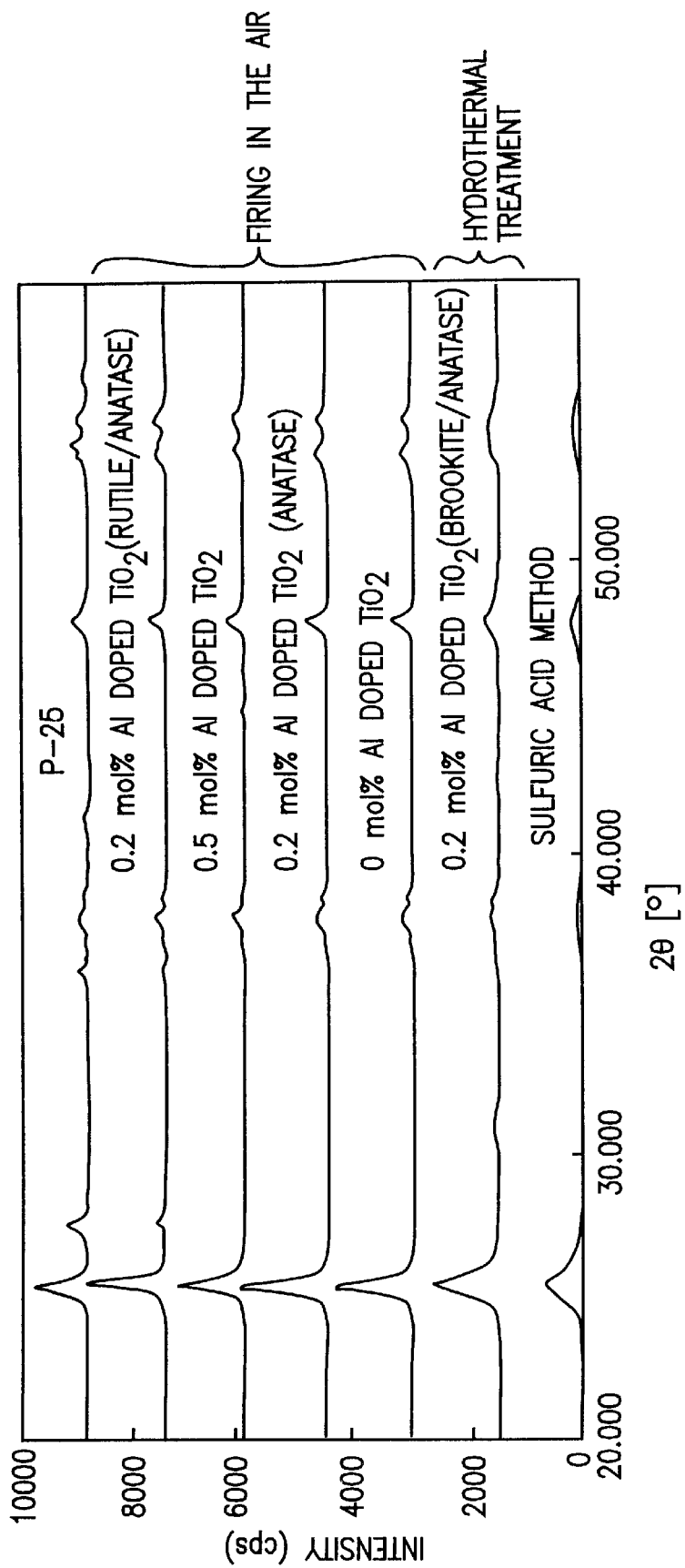
FIG. 6 shows X-ray diffraction of the titanium compound according to an example of the present invention and of the conventional titanium oxide.

FIG. 6 shows X-ray diffraction of the titanium compounds according to the example of the present invention and those of the conventional titanium oxide. As shown in FIG. 6, in the case where the titanium compound powder is prepared from a complex alkoxide and fired in air according to the aforementioned method, it has an anatase structure or a rutile/anatase mixed structure. That is, at least portion of the titanium compound of according to the present invention has either the anatase structure or the rutile structure. On the other hand, when the complex alkoxide is subjected to a hydrothermal treatment instead of firing in air, the obtained titanium compound powder has an anatase/brookite mixed structure, i.e., it partly contains a brookite phase.

Figure 7:
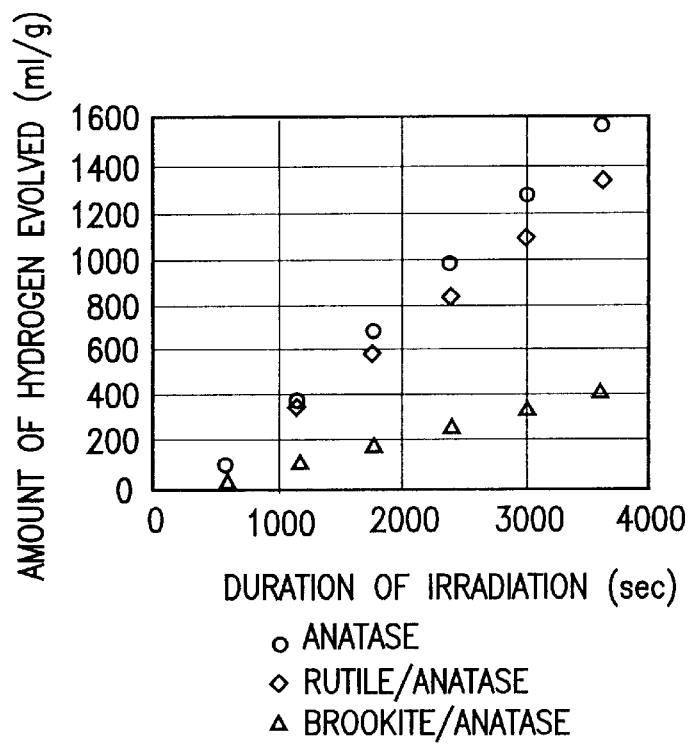
FIG. 7 is a diagram showing catalytic activity relative to the crystal phase constituting the titanium compound according to an example of the present invention.

FIG. 7 is a diagram showing how the catalytic activity is related with the crystal phase constituting the titanium compound according to the example of the present invention. The titanium compound powder having the anatase structure or rutile/anatase mixed structure is superior to the titanium compound powder having the anatase/brookite mixed structure in the ability to evolve hydrogen. This result indicates that the desired crystal structure of titanium compound powder is anatase or rutile.

Figure 8:
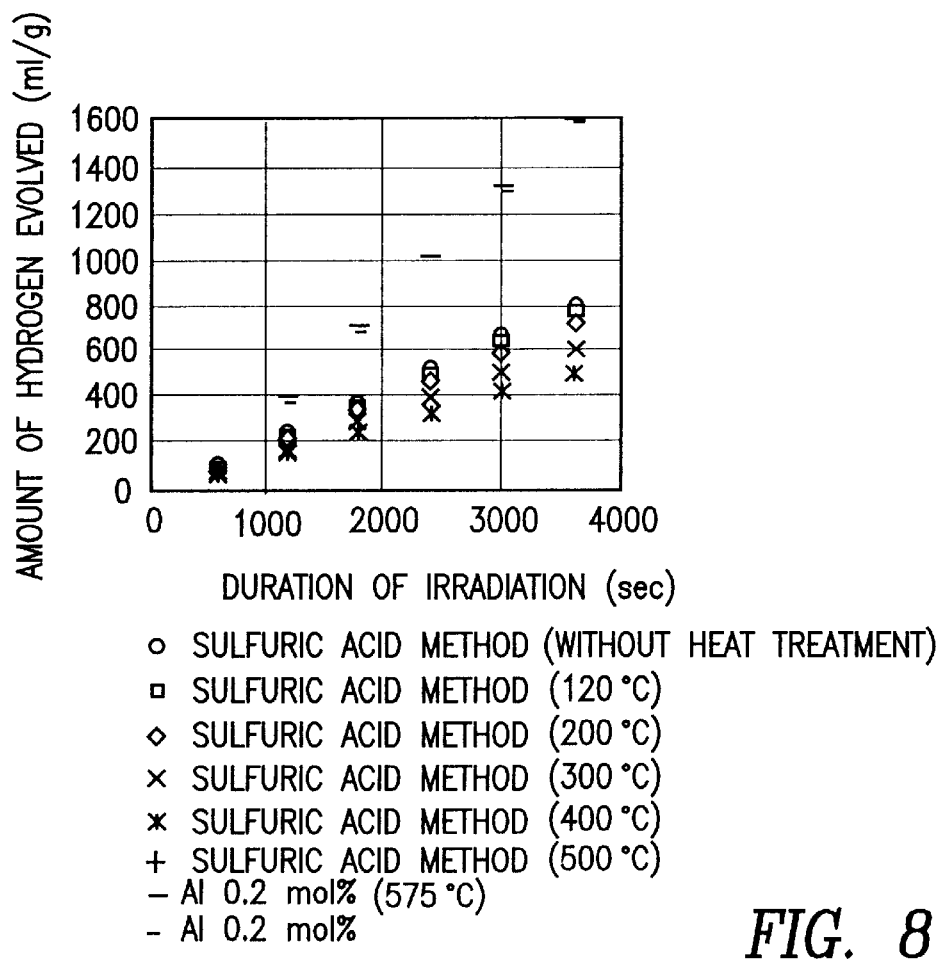
FIG. 8 is a diagram showing how the catalytic activity varies depending on the temperature of a heat treatment performed on the titanium compound according to an example of the present invention and the conventional titanium oxide having a high specific surface area and produced by the sulfuric acid method.

FIG. 8 is a diagram showing how the catalytic activity degrades under a heat treatment performed on the titanium compound according to the example of the present invention and the conventional titanium oxide having a high specific surface area and produced by the sulfuric acid method. As is clear from FIG. 8, the conventional titanium oxide powder prepared by the sulfuric acid method and having a high specific surface area deteriorates when heated above 200° C., whereas the titanium compound powder according to the present invention remains unchanged in the ability to evolve hydrogen even when heated at 575° C.

As explained above, the titanium compound for photochemical reactions according to the present invention is a substitutional solid solution of the titanium oxide in which aluminum atoms uniformly occupy the titanium sites in titanium oxide crystal. Therefore, it has high catalytic activity per unit weight and unit surface area and it is extremely stable to heat treatment.

In addition, the method of the present invention yields the above-mentioned titanium compound with desirable properties in a simple manner without requiring expensive complex apparatus, because the method includes the step of synthesizing a complex alkoxide of titanium and aluminum, thereby permitting formation of a gel having Ti—O—Al chemical bonds. In the process, lower alkoxides ($C_{1-10}$) are preferably reacted to form the complex but other alkoxides can also be used. The Ti and Al alkoxides need not be the same. Also, alkoxide exchange reaction illustrated can be omitted, if desired.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A titanium compound for photochemical reactions which is a substitutional solid solution of titanium oxide in which aluminum atoms occupy a portion of the titanium sites of the titanium oxide, wherein the aluminum atoms occupy about 0.01 to 0.5 mol % of the titanium sites.

2. The titanium compound for photochemical reactions according to claim 1, wherein aluminum atoms occupy about 0.15 to 0.3 mol % of the titanium sites.

3. The titanium compound for photochemical reactions according to claim 2, wherein the crystalline structure of the titanium compound is anatase or rutile or a combination thereof.

4. The titanium compound for photochemical reactions according to claim 1, wherein the crystalline structure of the titanium compound is anatase or rutile or a combination thereof.

5. A method for producing a Litanium compound for photochemical reactions comprising the steps of:

synthesizing a complex alkoxide of titanium and aluminum;

hydrolyzing the complex alkoxide of titanium and aluminum to yield a gel containing Ti—O—Al chemical bonds; and firing the gel to obtain the titanium compound for photochemical reactions, wherein the titanium compound is a substitutional solid solution of titanium oxide in which aluminum atoms occupy a portion of the titanium sites of the titanium oxide and wherein the aluminum atoms occupy about 0.01 to 0.5 mol % of the titanium sites.

6. The method for producing the titanium compound for photochemical reactions according to claim 7, wherein titanium lower alkoxide and aluminum lower alkoxide are reacted to synthesize the complex alkoxide.

7. The method for producing the titanium compound for photochemical reactions according to claim 6, wherein the reaction is effected at reflux.

8. The method for producing the titanium compound for photochemical reactions according to claim 7, wherein the lower alkoxide is isopropoxide.

* * * * *